United States Patent
von Blanckenhagen

(10) Patent No.: US 8,425,035 B2
(45) Date of Patent: Apr. 23, 2013

(54) SPECTACLE LENS WITH COLOR-NEUTRAL ANTI-REFLECTION COATING AND METHOD OF MAKING THE SAME

(75) Inventor: Bernhard von Blanckenhagen, Aalen (DE)

(73) Assignee: Carl Zeiss Vision GmbH, Aalen (DE)

( * ) Notice: Subject to any disclaimer, the term of this patent is extended or adjusted under 35 U.S.C. 154(b) by 0 days.

(21) Appl. No.: 13/043,280

(22) Filed: Mar. 8, 2011

(65) Prior Publication Data

US 2011/0228214 A1 Sep. 22, 2011

Related U.S. Application Data

(63) Continuation of application No. PCT/EP2009/006035, filed on Aug. 20, 2009.

(30) Foreign Application Priority Data

Sep. 8, 2008 (DE) .......................... 10 2008 041 869

(51) Int. Cl.
G02C 7/02 (2006.01)

(52) U.S. Cl.
USPC .................................. 351/159.6; 359/159.01

(58) Field of Classification Search .............. 351/160 R, 351/160 H, 159, 161, 162, 163, 159.01, 159.57, 351/159.6–159.65
See application file for complete search history.

(56) References Cited

U.S. PATENT DOCUMENTS

| 5,851,328 A * | 12/1998 | Kohan ........................... 156/102 |
| 6,165,598 A | 12/2000 | Nelson | |
| 2003/0077459 A1 * | 4/2003 | Vitt et al. ....................... 428/432 |
| 2004/0051950 A1 | 3/2004 | Noguchi | |
| 2007/0081249 A1 | 4/2007 | Schulz et al. | |
| 2007/0202251 A1 | 8/2007 | Koenig et al. | |
| 2008/0186448 A1 * | 8/2008 | Ishak et al. .................... 351/163 |
| 2009/0053465 A1 | 2/2009 | Scherg et al. | |
| 2010/0003508 A1 | 1/2010 | Arrouy et al. | |

FOREIGN PATENT DOCUMENTS

| DE | 199 36 940 A1 | 3/2001 |
| EP | 0 112 418 A1 | 7/1984 |
| EP | 1 557 698 A2 | 7/2005 |

OTHER PUBLICATIONS

Translation of International Preliminary Report on Patentability dated Mar. 17, 2011 of international application PCT/EP 2009/006035 on which this application is based.
English translation of the German Office action of May 13, 2009 in the corresponding German application.

* cited by examiner

Primary Examiner — James Greece
(74) Attorney, Agent, or Firm — Walter Ottesen

(57) ABSTRACT

A spectacle lens (2) has an antireflective coating (1). The antireflective coating (1) produces a residual reflection appearing color-neutral not only under illumination with a natural daylight spectrum, but also under an illumination with an illumination spectrum deviating from the natural daylight spectrum. A method for making a spectacle lens (2) having an antireflective coating (1) is described in which an optical lens (2a) is provided and a layer sequence of layers (3, 4, 5, 6, 7, 8, 9) with alternately high and low refractive material forming the antireflective coating (1) is applied to the optical lens. The antireflective coating (1) is applied with the proviso that the antireflective coating (1) produces a residual reflection appearing color-neutral not only under illumination with a natural daylight spectrum, but also under an illumination with an illumination spectrum deviating from the natural daylight spectrum.

19 Claims, 2 Drawing Sheets

SPECTACLE LENS WITH COLOR-NEUTRAL ANTI-REFLECTION COATING AND METHOD OF MAKING THE SAME

CROSS REFERENCE TO RELATED APPLICATIONS

This application is a continuation application of international patent application PCT/EP 2009/006035, filed Aug. 20, 2009, designating the United States and claiming priority from German application 10 2008 041 869.2, filed Sep. 8, 2008, and the entire content of both applications is incorporated herein by reference.

FIELD OF THE INVENTION

The invention relates to a spectacle lens having an antireflection coating as well as a method for making an antireflection coating for a spectacle lens.

BACKGROUND OF THE INVENTION

Incident light is reflected on the surfaces of a spectacle lens. The proportion of the reflected light is dependent on the incident angle and the refractive index of the lens. Thus, for example, the proportion of light reflected on each surface of an untreated spectacle lens having a refractive index of 1.5 with perpendicular incident light is about 4%, so that only about 92% of the incoming light is transmitted through the spectacle lens. The light reflected by the spectacle lens causes disturbing glare on its front side as well as its back side facing the wearer of the spectacles. The reflections on the front side of the spectacle lens are perceived as disturbing by a person standing opposite the wearer of the spectacles. The light reflected by the back side causes the person wearing the spectacles to perceive, among other unwanted optical effects, a blurred image.

Antireflections for the most part eliminate these disturbing reflections because they increase the amount of light passing through the spectacle lens. Spectacle lenses with high-quality antireflection on the front and back sides have a light transmittance of about 98%, which corresponds approximately to a light reflectance of 1% per surface.

Usually, the antireflection is achieved with the assistance of a so-called antireflection coating. The reduction of reflections hereby is based on the principle of interference. The antireflection coating comprises a plurality of thin layers which are several ten nanometers thick and are monolithically arranged on top of each other with different refractive indexes. The light waves reflected by the coating surface are superimposed and ideally cancel each other out.

Because of the finite number of layers in an antireflection coating, it is not possible to completely eliminate the reflection over the entire visible spectrum.

Therefore, antireflection coatings generally lead to a colored residual reflection. The reflection color is determined by the location of the maximum of the reflection curve as a function of the wavelength.

One quality criterion of antireflection coatings for spectacle lenses is the color of the residual reflection. This determines the cosmetic appearance of the spectacle lens to quite some extent. The usual antireflection coating of spectacle lenses has a green residual reflection. For example, the reflection of a surface of the antireflective spectacle lens has a value between 0.75% and 1.5% at a wavelength of 500 nm. United States patent application publication 2007/0202251 A1, on which the invention is based, discloses a spectacle lens with an antireflection coating which, under illumination of a natural daylight spectrum, causes a color-neutrally appearing residual reflection.

The antireflection coating disclosed in United States patent application publication 2007/0202251 A1 has proven itself for the application described therein. The application disclosed therein relates to an antireflection coating which is applied directly to the substrate, for example, a spectacle lens.

Modern coatings for plastic spectacle lenses are configured differently than described in United States patent application publication 2007/0202251 A1. The antireflection coating is not applied directly to the spectacle lens. Instead, it is provided with a scratch-resistant layer beforehand. This is necessary since plastics for spectacle lenses such as polythiourethane have a very low scratch resistance. To make the spectacle lens product scratch-resistant, spectacle lenses are, for example, coated with a hard lacquer in an immersion process. After hardening of the hard lacquer the coated spectacle lenses have a high scratch resistance. The thickness of such a hardened layer is typically between 2 and 4 micrometers.

In many spectacle lens products, the antireflection coating is applied on the scratch-resistant layer.

Even though the antireflection coating described in United States patent application publication 2007/0202251 A1 has essentially proven effective also for plastic spectacle lenses with scratch-resistant coating and antireflection coating, it has been found that while the residual reflection is not consciously perceived in natural sunlight it is perceived to be disturbing, for example, for both the wearer of the spectacles and the person standing opposite the wearer of the spectacles in rooms with fluorescent tube lighting.

SUMMARY OF THE INVENTION

It is an object of the invention to provide a spectacle lens whose residual reflection is perceived less disturbing, for example, under fluorescent tube lighting. Further, it is an object of the invention to provide a method of making a spectacle lens with an antireflection coating whose residual reflection is perceived as color-neutral not only under natural daylight illumination but also under lighting which deviates from natural daylight illumination.

The spectacle lens of the invention includes: an antireflection coating generating a color neutral appearing residual reflectance when illuminated with a natural daylight spectrum; and, the antireflection coating being configured to also generate a color neutral appearing residual reflectance when illuminated with an illumination spectrum which departs from the natural daylight spectrum.

The method of the invention is for making a spectacle lens having an antireflection coating. The method includes the steps of: providing an optical lens; applying a layer sequence configured to form an antireflection coating onto the spectacle lens, the layer sequence including layers of material having high, low and intermediate refractive indexes; wherein: the application of the antireflection layer is accompanied by a first requirement that the antireflection coating generate a color-neutral appearing residual reflectance when illuminated by a natural daylight spectrum; and, the application of the antireflection layer is accompanied by a second requirement that the antireflection coating generate a color-neutral appearing residual reflectance when illuminated by an illumination spectrum deviating from the natural daylight spectrum.

FIG. 3 of United States patent application publication 2007/0202251 A1 compares the percentage of reflectance of a conventional antireflection coating with a colored residual reflection in relation to the percentage of reflectance of an antireflection coating with a white residual reflection as a function of the wavelength in the visible spectral range. From this FIG. 3, one gathers that the spectral reflection curve of the antireflection coating with white residual reflection runs an approximately horizontal course in the visible spectral range. Extensive studies have shown that the residual reflection is only perceived as color-neutral/white under natural daylight but appears colored in rooms with fluorescent tube lighting.

The subjective perception is substantiated by calculations. The calculation is based on a reflection curve as is taken from FIG. 3 of United States patent application publication 2007/0202251 A1 for the antireflection coating for generating a white residual reflection. Under daylight illumination, represented by the so-called CIE standard illumination D65 (x=0.312713, y=0.329016 in the CIE-XYZ color coordinate system; daylight of a cloudless sky in the afternoon at a north window, similar to a spectrum of a black body at 6504 Kelvin) in the CIE-LAB color coordinate system for the above mentioned reflectance curve the coordinates shown in Table 1 result for the color reproduction quality Ra:

TABLE 1

LAB color coordinates of a color-neutral antireflection of the D65 standard according to FIG. 3 of United States patent application publication 2007/0202251 A1:

| D65 | a* | b* | L* |
|---|---|---|---|
| Ra | 0.0 | 0.0 | 6.3 |

If an illumination curve of a typical fluorescent tube is used for the calculation of the color coordinates a* and b*, one gets the following coordinates shown in Table 2 for the same reflectance curve:

TABLE 2

LAB color coordinates of a color-neutral antireflection according to FIG. 3 of United States patent application publication 2007/0202251 A1 under illumination of a typical fluorescent tube

| Tube | a* | b* | L* |
|---|---|---|---|
| Ra | −3.4 | −3.3 | 6.3 |

The values of the color coordinates of Table 2 are larger than 2 for a* and b*. Thus, the residual reflectance under illumination with a typical fluorescent tube is no longer perceived as color-neutral.

With plastic spectacle lenses having scratch-resistant coating and antireflection coating, the difference in perception under different lighting conditions is even larger. Hard lacquers, which differ in refractive index $n_h$ from the refractive index $n_s$ of the (spectacle lens) substrate, are often used in industry for the production of the scratch-resistant layer. An example of such a difference is the use of a hard lacquer having a refractive index of $n_h$=1.62 on a substrate having a refractive index of $n_s$=1.60 (refractive indexes relate to a wavelength of 550 nm). This difference in the refractive index results in that the course of the reflectance as a function of the wavelength (referred to as reflectance curve in the following) is no longer smooth (as for example in FIG. 3 of the application United States patent application publication 2007/0202251 A1), but rather a oscillation is superimposed (see FIG. 3 of this application). The distance of the maxima of these oscillations (about 30 nm in FIG. 3) depends on the thickness of the hard lacquer layer. These oscillations have a large influence on the color of the residual reflectance of the antireflection coating, especially when the reflectance color is viewed under different lighting conditions. In general, the reflection color of an antireflection coating perceived by an observer depends on the lighting conditions. The color impression perceived by an observer is different depending on whether the color reflectance is observed under daylight or under artificial light. The differences are especially clear whenever the color reflectance under daylight is compared to the lighting of fluorescent tubes.

An object of the present invention is to minimize the difference of the color of the residual reflectance of the antireflection coating under different lighting in order to achieve the same appearance of the reflectance color regardless of the environment and lighting conditions. Accordingly, the spectacle lens according to the invention is provided with an antireflection coating which has a color-neutrally appearing residual reflectance not only under a natural daylight spectrum but also under lighting conditions with an illumination spectrum which differs from a natural daylight spectrum. In particular, this is also ensured for spectacle lenses which are provided with antireflection coating and a scratch-resistant layer, whose refractive index differs from the refractive index of the spectacle lens substrate. The object is achieved when the fact that the color-neutral/white appearance of the residual reflectance is to be ensured under different lighting conditions is taken into account when configuring the interference layer system of which the antireflection coating is constructed.

In general, it is sufficient to consider two extreme lighting conditions under which the cited condition is complied with, namely under daylight (for example, D65 illumination) and under lighting having an illumination spectrum of a light bulb (for example, CIE standard illumination A, x=0.4476, y=0.4074 in the CIE-XYZ color coordinate system) or a gas discharge lamp, such as a fluorescent lamp corresponding to the CIE standard illumination C having the CIE-XYZ color coordinates x=0.3101 and y=0.3162. Of course, it is also possible to consider the illumination spectrum of a mercury vapor lamp or an illuminating gas light coated with a fluorescent material, such as for example a neon light, or the illumination spectrum of another typical light source as a second (or additional) illumination spectrum under which the residual reflectance coming from the spectacle lens appears (at least approximately) white/color-neutral, instead of the CIE standard illumination A of a light bulb or the CIE standard illumination C of a fluorescent tube light.

White light is divided into three color temperature regions according to DIN 5035 as shown in the following Table 3.

TABLE 3

Color temperature regions according to DIN 5035

| Abbreviation | Description | Color Temperature | Use |
|---|---|---|---|
| ww | warm white | <3300 K | Conference and Office Rooms, Guest Rooms, Living Spaces |
| nw | cool white | 3300 K to 5300 K | Schools, Offices, Workshops, Exhibition Spaces |

TABLE 3-continued

Color temperature regions according to DIN 5035

| Abbreviation | Description | Color Temperature | Use |
|---|---|---|---|
| tw | day light | >5300 K | Substitute for daylight in closed rooms and for technical uses |

According to the teaching of the invention, the antireflection coating can be configured such that it generates a color-neutrally appearing residual reflectance when illuminated with a natural daylight spectrum as well as when illuminated with an illumination spectrum of an artificial light source having an illumination spectrum of one of the standard color temperature regions of warm white, cool white, or daylight.

Under color-neutrally appearing residual reflectance, the person of ordinary skill in the art recognizes a reflectance whose color coordinate a* of the L*a*b* color coordinate system is in the range between [−1.5]<a*<[1.5], preferably, however, in the range between [−1.3]<a*<[1.1]. Correspondingly, the color coordinate b* of the L*a*b* color coordinate system is in the range [−1.5]<b*<[1.5], preferably, however, in the range between [−1.4]<b*<[1.2]. The brightness color coordinate L* of the L*a*b* color coordinate system can be in the range between [0]<L*<[7], preferably, however, between [4]<L*<[6]. The given limits in the color coordinates for the perception of color-neutral residual reflectance can be different from person to person according to how well the color perception of the individual is pronounced.

The antireflection coating of the spectacle lens can, for example, include an interference layer system with a layer stack of alternating high and low refractive materials. The materials used, of which the layers are formed, are transparent in the visual spectral region. The layer thicknesses of the individual layers are generally smaller than the wavelength of the visible light. It can, for example, be a layer system of three different layer materials. The layer closest to the substrate is, for example, of a material having a refractive index which is as low as possible. The next layer is of a material having a refractive index which is as high as possible, and the material of the third layer has a refractive index which has a value between that of the two other materials. For example, the interference layer system can have the following layer sequence (sequence starting from the substrate): 22 nm $HfO_2$, 14 nm $SiO_2$, 36 nm $HfO_2$, 88 nm $Nb_2O_5$, 24 nm $HfO_2$, 75 nm $SiO_2$. Thereby, the layer material $SiO_2$ has the lowest refractive index, the material $Nb_2O_5$ the highest refractive index, and the material $HfO_2$ the intermediate refractive index. Further, it can be advantageous to apply a further layer on the outer layer which changes the surface characteristics of the antireflection layer system so that the spectacle lens is especially easy to clean. If this is the case, the individual layer thicknesses need to be considered during configuration. Such easy-to-clean coatings are hydrophobic and/or oleophobic coatings having a surface energy under 20 mN/m.

A scratch-resistant layer can be provided between the spectacle lens and the antireflection coating. This is especially advantageous when a very soft spectacle lens material, such as polycarbonate, polythiourethane, etc. is used. It is expedient when the refractive index of the scratch-resistant layer has the same refractive index as the spectacle lens. Refractive index differences of up to 0.5 are tolerable, however. Layer thicknesses between 2 and 4 μm are typical.

A method for the production of a spectacle lens having an antireflection coating according to the invention includes the following method steps:

In a first step a), an optical lens made of a material transparent for visible light, such as, for example, glass (for example, silicate glass) or plastic (for example, polycarbonate, polymethyl-methacrylate, polythiourethane, or polyallyl diglycol-carbonate) is provided.

In a second step b), the lens can be provided with a scratch-resistant layer. This layer can be applied with a suitable hard lacquer, for example, by means of a dipping method. Alternatively, the layer can also be applied via a spin coating process. Ideally, the refractive index of the material of the scratch-resistant layer is the same as that of the lens material. However, it can also differ therefrom. The difference can be as large as 0.5. Depending on the use, this step can be omitted.

In a third step c), a layer sequence which forms the antireflection coating of alternating layers of high-refractive (H) and low-refractive (L) material is applied. In special cases, it can be advantageous to use a layer material (M) having a refractive index which lies between that of the materials H and L. This layer sequence (for example, consisting of four layer H/L/H/L or H/L/M/L (sequence starting from the substrate)), for example, can be applied with the aid of a vacuum process such as vaporizing or sputtering. The application of the antireflection coating is effected with the proviso that the antireflection coating creates a color-neutrally appearing residual reflectance under both illumination with a natural daylight spectrum and an illumination having an illumination spectrum differing from the natural daylight spectrum.

The configuration of the interference layer system, which forms the antireflection coating, for example, is done under numerical consideration of two lighting conditions. Typically, these are the natural daylight and a lighting condition based on fluorescent tubes. For the configuration of the interference layer system, numerical optimization processes can be used, such as are known from the in-house state of the art. These are based, for example, on the fact that parameters such as the thicknesses and/or materials of the individual layers are changed in such a manner that the spectral reflectance curve corresponds exactly to a target curve.

In this manner, target values for the color appearance of the residual reflectance can be provided. In addition to the target color values, two types of lighting are simultaneously predetermined. The individual layer thicknesses and/or materials are suitably changed until the color reflectance corresponds to the target value as closely as possible under both lighting conditions.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
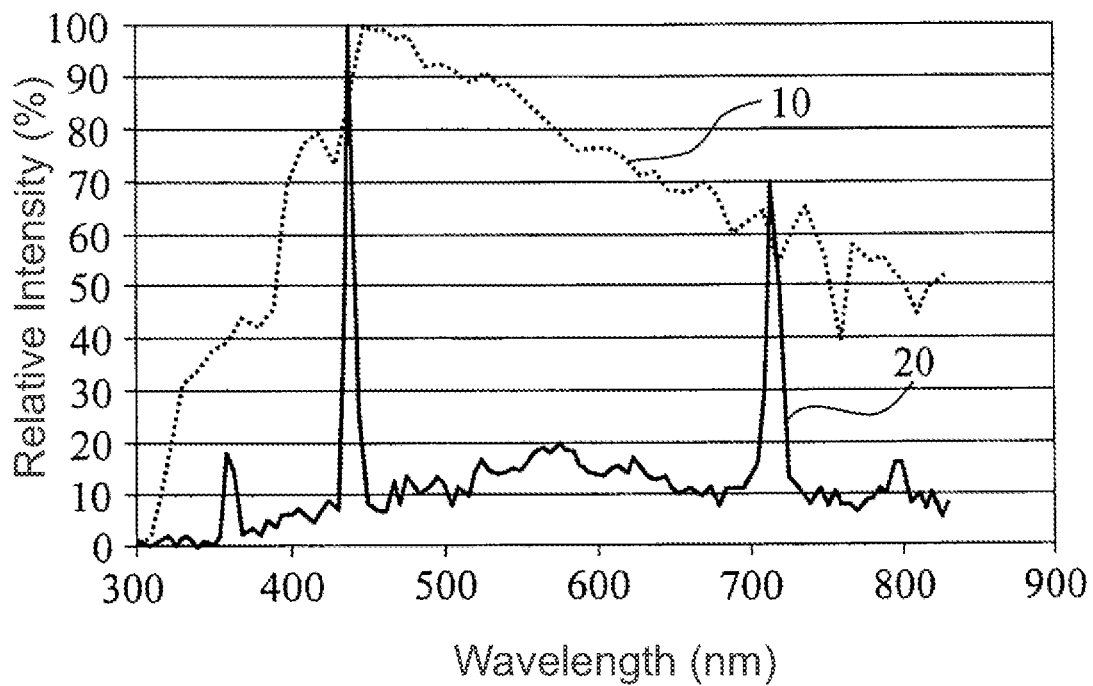
FIG. 1 shows standardized emission spectrums of the D65 standard and a typical fluorescent tube.

FIG. 1 shows the illumination curves of daylight 10 standardized to 100% intensity (here approximated to the D65 standard known to the person of ordinary skill in the art) and a fluorescent tube 20. When simultaneously considering both illuminations (10, 20) during the configuration of the interference layer system, one obtains the spectral reflectance curve 30 of FIG. 3 for the antireflection coating 1 of a spectacle lens 2 shown in FIG. 2 (not to scale).

The antireflection coating 1 in the shown embodiment includes a scratch-resistant layer (x) and seven individual layers (3, 4, 5, 6, 7, 8, 9) which form the interference optical system.

The spectacle lens 2a which forms the substrate and has a refractive index $n_{2a}$ of 1.6 is initially provided with a scratch-resistant layer (x). The scratch-resistant layer (x) has a refractive index $n_x$ of 1.6 and a thickness $d_x$ of 2.5 μm. The system of the antireflection coating 1, which functions as an interference optical layer system, is applied on the scratch-resistant layer. The layers 7, 5, and 3 are comprised of the material hafnium oxide with a refractive index $n_7=n_5=n_3$ of 1.98 at a wavelength of 550 nm. The layer 7 has a thickness $d_x$ of 16 nm, the layer 5 has a thickness $d_5$ of 77 nm, and the layer 3 has a thickness $d_3$ of 31 nm. The layers 4 and 8 are comprised of silicon dioxide with a refractive index $n_4=n_8$ of 1.45 at 550 nm. The layer 4 has a thickness $d_4$ of 36 nm, and layer 8 has a thickness $d_8$ of 65 nm. The layer 6 is comprised of $Nb_2O_5$ with a refractive index $n_6$ of 2.4 at 550 nm and has a thickness $d_6$ of 31 nm. The layer 9 is an easy-to-clean layer which, for one thing, is part of the interference optical layer system and, for the other, guarantees easy cleaning of the spectacle lens due to its chemical surface characteristics. This layer comprises a fluoroorganic material with a refractive index $n_9$ of 1.38 at 550 nm and has a thickness $d_9$ of 5 nm.

Figure 3:
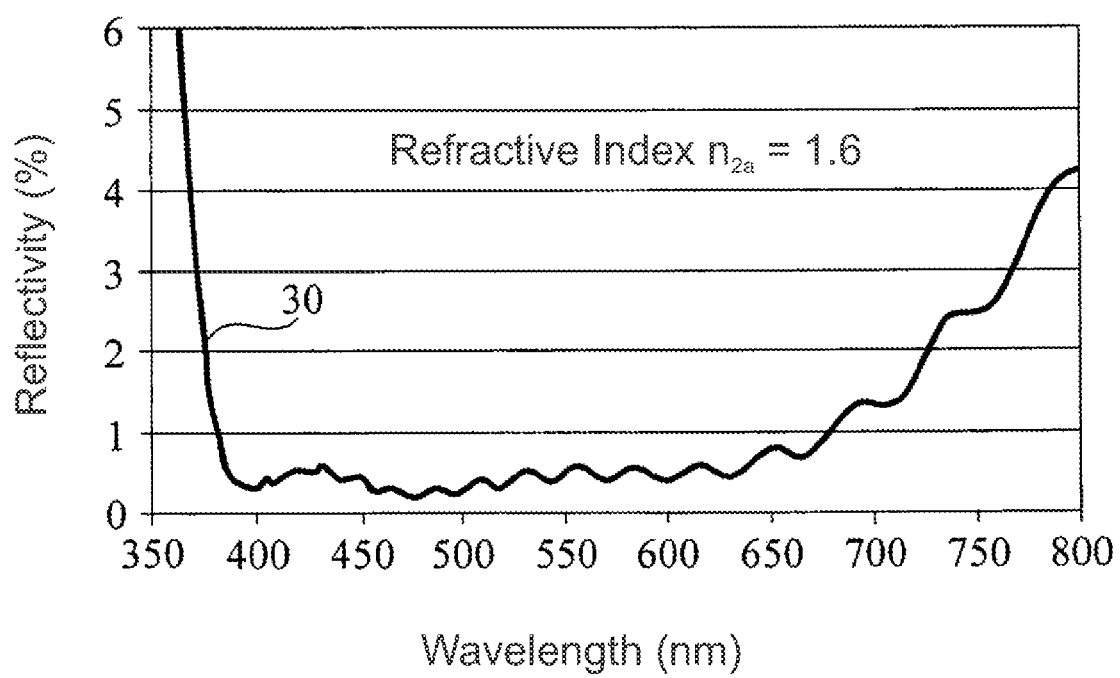

The course of the spectral reflectance curve 30 shown in FIG. 3 ensures that the appearance does not change excessively under different lighting. The color coordinates a* and b* under different lighting conditions are shown in the following Table 4.

TABLE 4

Figure 2:
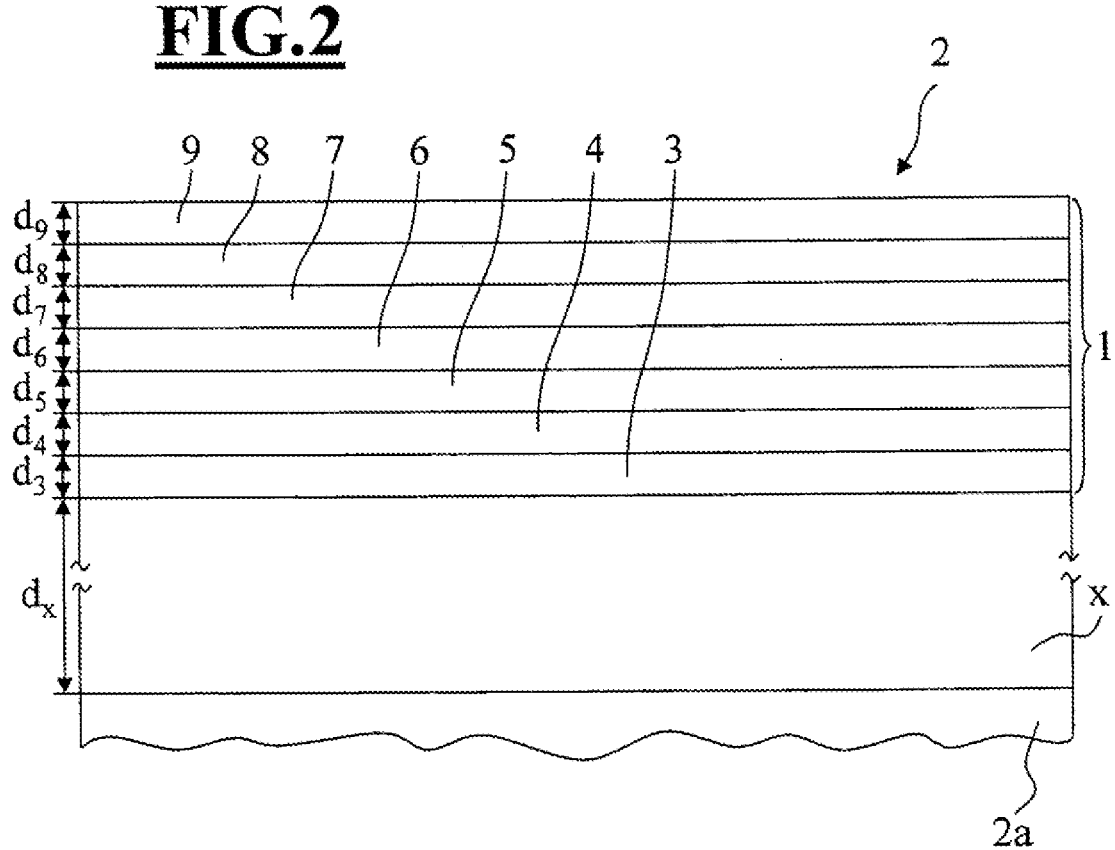
FIG. 2 shows an antireflection coating of the invention on a spectacle lens; and, FIG. 3 shows a reflectance spectrum of a spectacle lens with the antireflection coating of FIG. 2.

LAB color coordinates of the residual reflectance of the
D65 standard and the fluorescent tube according to Table 2 of the
antireflection coating of FIG. 2

| Ra | a* | b* | L* |
|---|---|---|---|
| D65 | 1.05 | 1.16 | 4.07 |
| Fluorescent Tube | −1.22 | −1.35 | 3.92 |

In comparison to the layer system described in United States patent application publication 2007/0202251 A1, the value of the color coordinates a* and b* is about 1, which corresponds to neutral/white color perception.

Aside from the above mentioned example, such a solution can also be achieved for different layer materials. The person of ordinary skill in the art knows that there is only one optimal solution for each combination of materials. Optimal solution is understood by the person of ordinary skill in the art to be the layer thicknesses which lead to values as small as possible for a* and b* when both illumination types are used simultaneously.

It can be advantageous to use a different material with a refractive index which is as high as possible, for example, titanium dioxide, tantalum pentoxide, or commercially available material mixtures such as H3, H4, or H5 from the Patinal product series of the Merck company, in place of niobium oxide. It can also be advantageous to use different materials with an intermediate refractive index such as, for example, zirconium oxide, aluminum oxide, or commercially available material mixtures such as M1, M2, or M3 from the Patinal product series of the Merck company, in place of hafnium oxide.

Exemplary embodiments of the invention are summarized and set forth below:

A. A spectacle lens (2) includes an antireflection coating (1), which generates a color neutral appearing residual reflectance when illuminated with a natural daylight spectrum (10). The antireflection coating (1) is configured so that it also generates a color neutral appearing residual reflectance (30) when illuminated with an illumination spectrum (20) which deviates from the natural daylight spectrum.

B. The spectacle lens (2) of clause A wherein the illumination spectrum (20) is the spectrum of an incandescent light bulb and/or a gas discharge lamp, in particular a fluorescent lamp, such as, for example, a mercury vapor lamp or fluorescent lamp coated with a fluorescent material such as, for example, a neon lamp.

C. The spectacle lens (2) of clause A or B wherein the illumination spectrum (20) is a spectrum in one of the standard color temperature ranges: warm white, neutral white, or daylight.

D. The spectacle lens (2) of one of the foregoing clauses wherein the illumination spectrum is one of the CIE standard spectra A or CIE standard spectra C.

E. The spectacle lens (2) of one of the foregoing clauses wherein the color neutral appearing residual reflectance (30) has a color coordinate a* of the L*a*b*-color coordinate system lying in the range of [−1.3]<a*<[1.1].

F. The spectacle lens (2) of one of the foregoing clauses wherein the color neutral appearing residual reflectance (30) has a color coordinate b* of the L*a*b*-color coordinate system lying in the range of [−1.4]<b*<[1.2].

G. The spectacle lens (2) of one of the foregoing clauses wherein the color neutral appearing residual reflectance (30) has a color coordinate L* of the L*a*b*-color coordinate system lying in the range of [4]<L*<[7].

H. The spectacle lens (2) of one of the foregoing clauses wherein the antireflection coating (1) further includes an interference layer system, wherein the interference layer system is configured from layers which are transparent in the visible spectral region and the layers have a layer thickness which is less than the wavelength of the visible light.

I. The spectacle lens (2) of clause H wherein the interference layer system has a layer sequence of materials having alternatingly high and low refractive indexes.

J. The spectacle lens (2) of clause H or I wherein the interference layer system includes at least one of a hydrophobic and an oleophobic surface layer having a surface energy of less than 20 mN/m.

K. The spectacle lens (2) of clause H or J wherein the spectacle lens has a spectacle lens substrate (2a) and the interference layer system has the following layer sequence starting from the spectacle lens substrate: a first layer of hafnium oxide (3), a second layer of silicon dioxide (4), a third layer of hafnium oxide (5), a fourth layer of niobium pentoxide (6), a fifth layer of hafnium oxide (7), a sixth layer of silicon oxide (8) and a seventh layer of an easy-to-clean coating (9).

L. The spectacle lens (2) of clause K wherein the first layer (3) has a layer thickness ($d_3$) of 16 nm, the second layer (4) has a layer thickness ($d_4$) of 36 nm, the third layer (5) has a layer thickness ($d_5$) of 77 nm, the fourth layer (6) has a layer thickness ($d_6$) of 88 nm, the fifth layer (7) has a layer thickness ($d_7$) of 31 nm, the sixth layer (8) has a layer thickness ($d_8$) of 65 nm and the seventh layer (9) has a layer thickness ($d_9$) of 5 nm.

M. The spectacle lens (2) of one of the foregoing clauses further including a scratch resistant layer (x) disposed under the antireflection coating (1).

N. The spectacle lens (2) of clause M further including a spectacle lens substrate (2a) having a refractive index ($n_{2a}$), and wherein the scratch resistant layer (x) has a refractive index ($n_x$) which differs from the refractive index ($n_{2a}$) of the spectacle lens substrate (2a) by up to 0.5.

O. The spectacle lens (2) of clause M or N wherein the scratch resistant layer (x) has a thickness ($d_x$) between 2 and 4 micrometer.

P. The spectacle lens (2) according to one of the clauses M through O wherein the scratch resistant layer was applied through the application of a hard lacquer in a dipping method or a spin coating method with subsequent hardening.

Q. A method of making a spectacle lens (2) having an antireflection coating (1), the method including the steps of:
a) providing an optical lens (2a).
b) optionally applying a scratch resistant layer (x).
c) applying a layer sequence (3, 4, 5, 6, 7, 8, 9) configured to form an antireflection coating (1) onto the spectacle lens (2a), the layer sequence including layers of material having high, low and intermediate refractive indexes. The application of the antireflection coating (1) is accompanied by the requirement that the antireflection coating (1) generate a color-neutral appearing residual reflection (30) when illuminated by a natural daylight spectrum (10). The application of the antireflection coating (1) is accompanied by the further requirement that the antireflection coating (1) generate a color-neutral appearing residual reflection (30) when illuminated by an illumination spectrum (20) deviating from a natural daylight spectrum (10).

R. The method of clause Q wherein in step a), the optical lens (2a) is made of a plastic or a glass.

S. The method of clause R wherein the plastic is a polythiourethane or the glass is a silicate glass.

T. The method according to one of the clauses Q through S wherein the scratch resistant layer (x) in step b) is applied through coating with an optically transparent hard lacquer.

U. The method according to one of the clauses Q through T wherein a common color target value is pregiven for the reflectance of the antireflection coating (1) occurring because of natural daylight and for the reflectance of the antireflection coating (1) occurring because of the deviating illumination, and one or several thicknesses and/or materials of the layers, which form the antireflection coating (1), are varied until the deviation of a computed color value for the natural daylight spectrum (10) and the deviation of a computed color value for the deviating illumination spectrum (20) drop below pregiven threshold values, and the threshold values are so selected that the color impression appears neutral under both illumination conditions.

It is understood that the foregoing description is that of the preferred embodiments of the invention and that various changes and modifications may be made thereto without departing from the spirit and scope of the invention as defined in the appended claims.

What is claimed is:

1. A spectacle lens comprising:
a spectacle lens body defining a surface;
an antireflection coat me applied to said surface to generate a color neutral appearing residual reflectance when illuminated with a natural daylight spectrum;
said antireflection coating including an interference layer system being configured to generate a color neutral appearing residual reflectance when illuminated with an illumination spectrum which departs from said natural daylight spectrum; and,
said interference layer system including a plurality of layers wherein each two mutually adjacent ones of said layers are made of respective materials having indices of refraction different from one another;
wherein said illumination spectrum is a spectrum in one of the standard color temperature ranges; warm white, neutral white, or daylight; or, said illumination spectrum is one of the CIE standard spectra A and CIE standard spectra C;
said color neutral appearing residual reflectance having a color coordinate a* of the L*a*b*-color coordinate system lying in the range of [−1.5]<a*<[1.5];
said color neutral appearing residual reflectance having a color coordinate b* of the L*a*b*-color coordinate system lying in the range of [−1.5]<b*<[1.5]; and,
said color neutral appearing residual reflectance having a color coordinate L* of the L*a*b*-color coordinate system lying in the range of [0]<L*<[7].

2. The spectacle lens of claim 1, wherein:
said color neutral appearing residual, reflectance has a color coordinate a* of the L*a*b*-color coordinate system lying in the range of [−1.3]<a*<[1.1].

3. The spectacle lens of claim 1, wherein:
said color neutral appearing residual reflectance has a color coordinate b* of the L*a*b*-color coordinate system lying in the range of [−1.4]<b*<[1.2].

4. The spectacle lens of claim 1, wherein;
said color neutral appearing residual reflectance has a color coordinate L* of the L*a*b*-color coordinate system lying in the range of [4]<L*<[7].

5. The spectacle lens of claim 1, wherein said interference layer system is configured from layers which are transparent in the visible spectral region; and, said layers have an optical thickness which is less than the wavelength of the visible light.

6. The spectacle lens of claim 5, wherein said interference layer system has a layer sequence of materials having alternatingly high and low refractive indexes.

7. A spectacle lens comprising:
an antireflection coating generating a color neutral appearing residual reflectance when illuminated with a natural daylight spectrum;
said antireflection coating being configured also generate a color neutral appearing residual reflectance when illuminated with an illumination spectrum which departs from said natural daylight spectrum;
when said antireflection coating rather comprises an interference layer system, wherein:
said interference layer system is configured from layers which are transparent in the visible spectral region;
said layers have an optical thickness which is less than the wavelength taken of the range of visible light; and,
said interference layer system includes at least one of a hydrophohic and an oleophobic surface layer having a surface energy of less than 20 mN/m.

8. A spectacle lens comprising:
a spectacle lens body defining a surface;
an antireflection coating applied to said surface to generate a color neutral a eating residual reflectance when illuminated with a natural daylight spectrum;
said antireflection coating including an interference layer system being configured to generate a color neutral appearing residual reflectance when illuminated with an illumination spectrum which departs from said natural daylight spectrum;

said interference layer system including a plurality of layers wherein each two mutually adjacent ones of said layers are made of respective materials having indices of refraction different from one another;

said interference layer system being configured from layers which are transparent in the visible spectral region; and, said layers having an optical thickness which is less than the wavelength of the visible light;

said spectacle lens having a spectacle lens substrate and wherein:

said interference layer system has the following layer sequence starting from said spectacle lens substrate:
a) a first layer Of hafnium oxide;
b) a second layer of silicon dioxide;
c) a third layer of hafnium oxide;
d) a fourth layer of niobium pentoxide;
e) a fifth layer of hafnium oxide;
f) a sixth layer of silicon oxide; and,
g) a seventh layer of an easy-to-clean coating.

9. The spectacle lens of claim 8, wherein:
said first layer has a layer thickness ($d_3$) of 16 nm;
said second layer has a layer thickness ($d_4$) of 36 nm;
said third layer has a layer thickness ($d_5$) of 77 nm;
said fourth layer has a layer thickness ($d_6$) of 88 nm;
said fifth layer has a layer thickness ($d_7$) of 31 nm;
said sixth layer has a layer thickness ($d_8$) of 65 nm; and,
said seventh layer has a layer thickness ($d_9$) of 5 nm.

10. The spectacle lens of claim 1 further comprising a scratch resistant layer disposed under said antireflection coating.

11. A spectacle lens comprising:
a spectacle lens body defining a surface;
an antireflection coating applied to said surface to generate a color neutral appearing residual reflectance when illuminated with a natural daylight spectrum;
said antireflection coating including an interference layer system being configured to generate a color neutral appearing residual reflectance When illuminated with an illumination spectrum which departs from said natural daylight spectrum;
said interference layer system including a plurality of layers wherein each two mutually adjacent ones of said layers are made of respective materials having indices of refraction different from one another;
a scratch resistant layer disposed under said antireflection coating;
a spectacle lens substrate having a refractive index ($n_{2a}$); and, wherein:
said scratch resistant layer has a refractive index ($n_x$) which differs from said refractive index ($n_{2a}$) of said spectacle lens substrate by up to 0.5.

12. The spectacle lens of claim 10, wherein said scratch resistant layer has a thickness ($d_x$) between 2 and 4 micrometers.

13. A method of making a spectacle lens having an antireflection coating, said method comprising the steps of:
providing an optical lens
applying a layer sequence configured to form an antireflection coating onto said spectacle lens, said layer sequence including a plurality of layers wherein each two mutually adjacent ones of said layers are made of respective materials having indices of refraction different from one another;

wherein:
the application of said antireflection coating is accompanied by a first requirement that said antireflection coating generate a color-neutral appearing residual reflectance when illuminated by natural daylight spectrum; and,
the application of said antireflection coating is accompanied by a second requirement that said antireflection coating generate a color-neutral appearing residual reflectance when illuminated by an illumination spectrum deviating from said natural daylight spectrum;
said illumination spectrum is a spectrum in one of the standard color temperature ranges: warm white, neutral white, or daylight; or, said illumination spectrum is one of the CIE standard spectra A and CIE standard spectra C;
said color neutral appearing residual reflectance having a color coordinate a* of the L*a*b*-color coordinate living system in the range of $[-1.5]<a*<[1.5]$;
said color neutral appearing residual reflectance having a color coordinate b* of the L*a*b*-color coordinate system living in the range of $[-1.5]<b*<[1.5]$; and,
said color neutral appearing residual reflectance having a color coordinate L* of the L*a*b*-color coordinate system lying in the range of $[0]<L*<[7]$.

14. The Method of claim 13, comprising the further step of applying a scratch resistant layer.

15. The method of claim 13, wherein a common color target value is pregiven for the reflectance of the antireflection coating occurring because of natural daylight and for the reflectance of the antireflection coating occurring because of the deviating illumination; and, one or several thicknesses and/or materials of the layers, which form the antireflection coating, are varied until the deviation of a computed color value for the natural daylight spectrum and the deviation of a computed color value for the deviating illumination spectrum drop below pregiven threshold values; and, the threshold values are so selected that the color impression appears neutral under both illumination conditions.

16. A spectacle lens comprising:
a spectacle lens body defining a surface;
an antireflection coating applied to said surface to generate a color neutral appearing residual reflectance when illuminated with a natural daylight spectrum;
said antireflection coating including an interference layer system being configured to generate a color neutral appearing residual reflectance when illuminated with an illumination spectrum which departs from said natural daylight spectrum; and,
said interference layer system including a first layer closest to said surface made of a material having a low refractive index and a next layer made of a material having a refractive index greater than said first layer and a third layer having a refractive index lying in a range between the refractive indices of said first and second layer;
wherein said illumination spectrum is a spectrum in one of the standard color temperature ranges: warm white, neutral white, or daylight; or, said illumination spectrum is one of the CIE standard spectra A and CIE standard spectra C;
said color neutral appearing residual reflectance having a color coordinate a* of the L*a*b*-color coordinate system lying in the range of $[-1.5]<a*<[1.5]$;

said color neutral appearing residual reflectance having a color coordinate b* of the L*a*b*-color coordinate system lying in the range of [−1.5]<b*<[1.5]; and, said color neutral appearing residual reflectance having a color coordinate L* of the L*a*b*-color coordinate lying in the range of [0]<L*<[7].

17. A spectacle lens comprising:

a spectacle lens body defining a surface;

a hard lacquer coating applied to said surface;

an antireflection coating applied on top of said hard lacquer coating to generate a color neutral appearing residual reflectance when illuminated with a natural daylight spectrum;

said antireflection coating including an interference layer system being configured to generate a color neutral appearing residual reflectance when illuminated with an illumination spectrum which departs from said natural daylight spectrum; and, said interference layer system including a plurality of layers wherein each two mutually adjacent ones of said layers are made of respective materials having indices of refraction different from one another;

wherein said illumination spectrum is spectrum in one of the standard color temperature ranges: warm white, neutral white, or daylight; or, said illumination spectrum is one of the CIE standard spectra A and CIE standard spectra C;

said color neutral appearing residual reflectance having color coordinate a* of the L*a*b*-color coordinate system lying in the range of [−1.5]<a*<[1.5];

said color neutral appearing residual reflectance having a color coordinate b* of the L*a*b*-color coordinate system lying in the range of [−1.5]<b*<[1.5]; and said color neutral appearing residual reflectance having a Color coordinate L* of the L*a*b*-color coordinate system lying in the range of [0]<L*<[7].

18. A spectacle lens comprising:

an antireflection coating generating a color neutral appearing residual reflectance when illuminated with a natural daylight spectrum;

said antireflection coating being configured to also generate a color neutral appearing residual reflectance when illuminated with an illumination spectrum which departs from said natural daylight spectrum;

wherein said antireflection coating further comprises an interference layer system, wherein:

said interference layer system is configured from layers which are transparent in the visible spectral region;

said layers have an optical thickness which is less than the wavelength taken of the range of visible light; and, said interference layer system includes an outer layer defined by a hydrophobic or an oleophobic layer having a surface energy of less than 20 mN/m.

19. A method of making a spectacle lens having an antireflection coating, said method comprising the steps of:

providing an optical lens defining a surface;

applying a layer sequence configured to form an antireflection coating onto said spectacle lens, said layer sequence including a first layer closest to said surface made of a material having a low refractive index and a next layer made of a material having a refractive index greater than said first layer and a third Layer having a refractive index lying in a range between the refractive indices of said first and second layers;

wherein:

the application of said antireflection coating is accompanied by a first requirement that said antireflection coating generate a color-neutral appearing residual reflectance when illuminated by a natural daylight spectrum; and, the application of said anti reflection coating is accompanied by a second requirement that said antireflection coating generate a color-neutral appearing residual reflectance when illuminated by an illumination spectrum deviating from said natural daylight spectrum;

said illumination spectrum is a spectrum in one of the standard color temperature ranges: warm white, neutral white, or daylight; or, said illumination spectrum is one of the CIE standard spectra A and CIE standard spectra C;

said color neutral appearing residual reflectance having a color coordinate a* of the L*a*b*-color coordinate system lying in the range of [−1.5]<a*<[1.5];

said color neutral appearing residual reflectance having a color coordinate b* of the L*a*b*-color coordinate system lying in the range of [−1.5]<b*<[1.5]; and, said color neutral appearing residual reflectance having a color coordinate L* of the L*a*b*-color coordinate system lying in the range of [0]<L*<[7].

* * * * *

UNITED STATES PATENT AND TRADEMARK OFFICE
CERTIFICATE OF CORRECTION

PATENT NO. : 8,425,035 B2
APPLICATION NO. : 13/043280
DATED : April 23, 2013
INVENTOR(S) : Bernhard von Blanckenhagen It is certified that error appears in the above-identified patent and that said Letters Patent is hereby corrected as shown below:

In the Claims

In Column 10:

Line 24: delete "residual," and substitute -- residual -- therefor.

Line 48: insert -- to -- after "configured".

Line 52: delete "rather" and substitute -- further -- therefor.

Line 64: delete "a eating" and substitute -- appearing -- therefor.

In Column 11:

Line 17: delete "Of" and substitute -- of -- therefor.

Line 42: delete "When" and substitute -- when -- therefor.

In Column 12:

Line 28: delete "Method" and substitute -- method -- therefor.

In Column 13:

Line 30: insert -- a -- before "color".

Line 36: delete "Color" and substitute -- color -- therefor.

In Column 14:

Line 17: delete "Layer" and substitute -- layer -- therefor.

Signed and Sealed this
Eighteenth Day of June, 2013

Teresa Stanek Rea
*Acting Director of the United States Patent and Trademark Office*